(12) United States Patent
Tzivanopoulos et al.

(10) Patent No.: US 12,365,264 B2
(45) Date of Patent: Jul. 22, 2025

(54) VOLTAGE MEASUREMENT METHOD AND OPERATING METHOD FOR A VEHICLE ON-BOARD POWER SUPPLY SYSTEM

(71) Applicant: Robert Bosch GmbH, Stuttgart (DE)

(72) Inventors: Chrysanthos Tzivanopoulos, Grossbettlingen (DE); Isaias Miguel Alejandro Santucho, Stuttgart (DE); Johannes Swoboda, Stuttgart (DE); Mathis Wolf, Kornwestheim (DE); Thomas Barabas, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/511,214

(22) Filed: Nov. 16, 2023

(65) Prior Publication Data

US 2024/0174129 A1    May 30, 2024

(30) Foreign Application Priority Data

Nov. 17, 2022   (DE) .................... 10 2022 212 231.3

(51) Int. Cl.
*B60L 58/18*        (2019.01)

(52) U.S. Cl.
CPC .................... *B60L 58/18* (2019.02)

(58) Field of Classification Search
CPC ...................................... B60L 58/18
See application file for complete search history.

(56) References Cited

U.S. PATENT DOCUMENTS

| | | | | |
|---|---|---|---|---|
| 6,486,636 B1* | 11/2002 | Stolitzka | ............... | H02J 7/0048 320/128 |
| 9,069,027 B2* | 6/2015 | Chao | .................... | G01R 31/396 |
| 10,429,450 B2* | 10/2019 | Lee | ........................ | G01R 31/396 |
| 11,394,066 B2* | 7/2022 | Liu | ........................ | H01M 10/633 |
| 11,909,244 B2* | 2/2024 | Li | .......................... | H01M 10/44 |
| 2007/0024240 A1 | 2/2007 | Morita et al. | | |
| 2013/0103332 A1* | 4/2013 | Chen | ..................... | G01R 31/396 702/63 |
| 2014/0025323 A1* | 1/2014 | Chao | .................... | G01R 35/005 702/63 |

FOREIGN PATENT DOCUMENTS

| | | |
|---|---|---|
| DE | 102020214562 A1 | 5/2022 |
| WO | 2019076662 A1 | 4/2019 |

* cited by examiner

*Primary Examiner* — Rexford N Barnie
*Assistant Examiner* — Esayas G Yeshaw
(74) *Attorney, Agent, or Firm* — Michael Best & Friedrich LLP

(57) ABSTRACT

A voltage measurement method for an on-board power supply system (100) of a vehicle, wherein the on-board power supply system (100) comprises a battery pack (10) with a plurality of battery cells (2) and at least one sub-grid (20, 30) which can be coupled to the battery pack (10) via contactors (SH+, SH−, SL+, SL−). According to the invention, the voltage measurement method comprises the following method steps:

In an initial calibration mode with open contactors (SH+, SH−, SL+, SL−):
  measurement of cell voltages (UZ) of the individual battery cells (2);
  calculation of a pack voltage (UP) of the battery pack (10) using the measured cell voltages (UZ);
  measurement of a pack voltage (UP) of the battery pack (10);
  calculation of a first correction factor for the pack voltage (UP) using the calculated pack voltage (UP) and the measured pack voltage (UP).

12 Claims, 1 Drawing Sheet

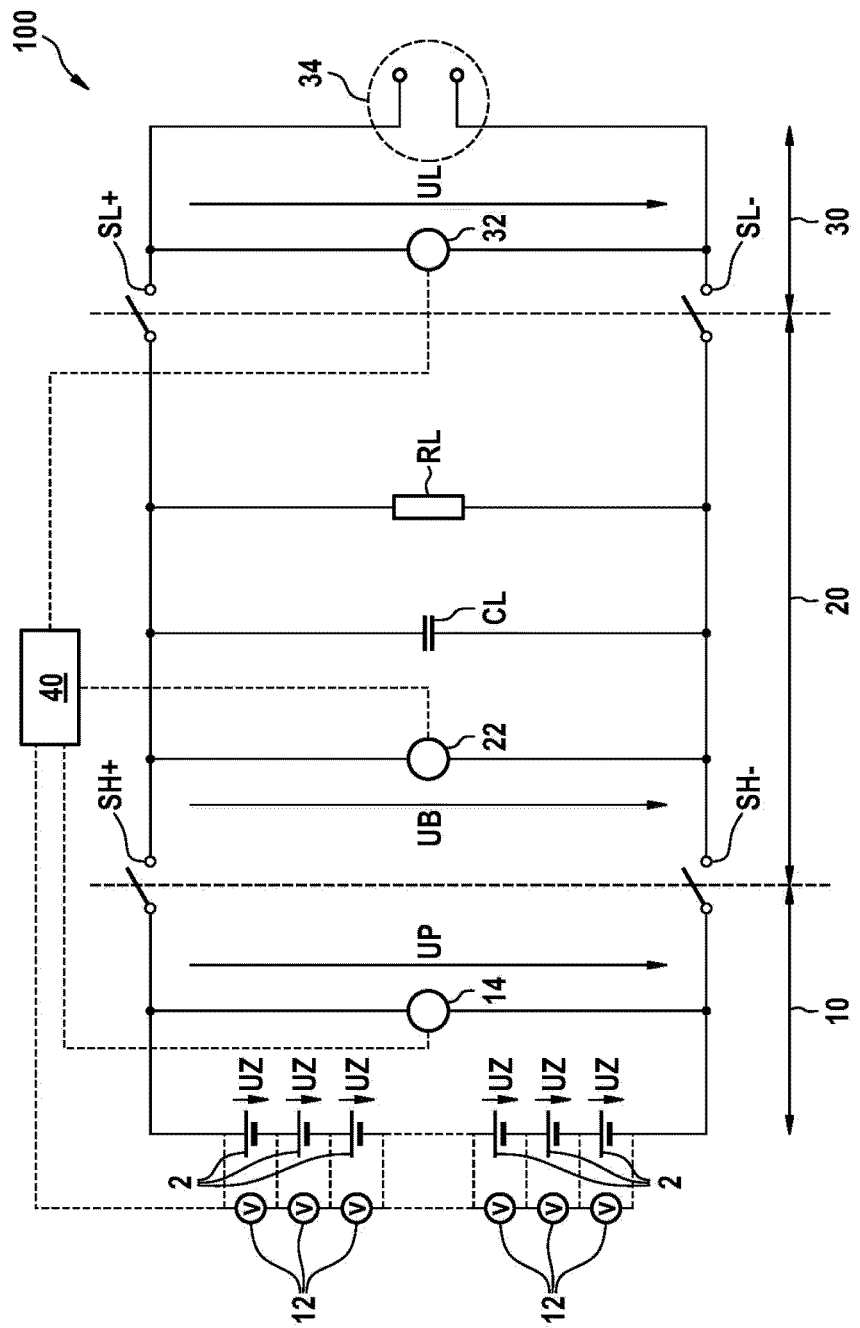

VOLTAGE MEASUREMENT METHOD AND OPERATING METHOD FOR A VEHICLE ON-BOARD POWER SUPPLY SYSTEM

BACKGROUND OF THE INVENTION

The invention relates to a voltage measurement method for a vehicle on-board power supply system, wherein the vehicle on-board power supply system comprises a battery pack with a plurality of battery cells and at least one sub-grid which can be coupled to the battery pack via contactors.

The invention also relates to an operating method for the vehicle on-board power supply system and a control unit which is configured to carry out the voltage measurement method and/or operating method according to the invention.

The main contactors are open when a vehicle is started. The battery voltage is present on the battery side, while the on-board power supply voltage is 0 V. The vehicle on-board power supply system is pre-charged up to the battery voltage so that the main contactor can disconnect the battery from the power supply.

However, the measurement of the battery and vehicle on-board power supply voltage is inaccurate, which means that the voltage across the contactor is actually greater than 0 V. This results in high inrush currents from the battery into the DC link capacitor in the vehicle on-board power supply system. This leads to accelerated aging of the contactors.

The voltages can be measured with high-precision voltage dividers. However, this leads to very high costs, as a vehicle on-board power supply system comprises a plurality of sub-grids whose voltages have to be measured.

The document WO 2019/076662 A1 discloses a voltage measurement method for a vehicle on-board power supply system. The vehicle on-board power supply system comprises a high-voltage grid and at least one other grid. High-precision voltage measurements are carried out.

SUMMARY OF THE INVENTION

A voltage measurement method for a vehicle on-board power supply system is proposed. The vehicle on-board power supply system comprises a battery pack with a plurality of battery cells and at least one sub-grid that can be coupled to the battery pack via contactors. The battery cells can be connected in series and/or parallel within the battery pack.

According to the invention, cell voltages of the individual battery cells are measured in a first calibration mode with open contactors. A pack voltage of the battery pack is then calculated using the measured cell voltages. The pack voltage is calculated according to the interconnection of the battery cells. For example, the calculated pack voltage for a series connection of battery cells is equal to the sum of the individual cell voltages. Advantageously, the calculated pack voltage is more accurate than a measured pack voltage. A pack voltage of the battery pack is then measured. A first correction factor for the pack voltage is then calculated using the calculated pack voltage and the measured pack voltage.

The following applies here:

$$k_1 = \frac{U_{P,cal}}{U_{P,meas}}$$

Where k1 is the first correction factor, which represents the absolute accuracy of the pack voltage, $U_{P,cal}$ is the calculated pack voltage and $U_{P,meas}$ is the measured pack voltage.

Preferably, the pack voltage of the battery pack is also measured in a second calibration mode with the contactors closed. A sub-grid voltage of at least one sub-grid is then measured. A second correction factor for the sub-grid voltage is then calculated using the measured and corrected pack voltage and the measured sub-grid voltage. The first correction factor can be used in the calculation of the second correction factor.

The following applies here:

$$k_2 = \frac{U_{P,meas}}{U_{N,meas}}$$

Where k2 is the second correction factor, which represents the relative accuracy of the pack voltage to the sub-grid voltage, $U_{P,meas}$ is the measured pack voltage and $U_{N,meas}$ is the measured sub-grid voltage.

If the vehicle on-board power supply system comprises a plurality of sub-grids, further correction factors, which represent the relative accuracy of the sub-grid voltages of the sub-grids to each other, can also be calculated using the same principle.

Furthermore, the first and second correction factors or the other correction factors are used in a measurement mode when measuring the pack voltage and the sub-grid voltage in the vehicle on-board power supply system. The measured values of the pack voltage and the sub-grid voltage can be corrected according to the following equations:

$$U_{P,real} = k_1 \cdot U_{P,meas}$$

and $$U_{N,real} = k_2 \cdot U_{N,meas}$$

$U_{P,real}$ is the real pack voltage and $U_{N,real}$ is the real sub-grid voltage.

Preferably, the first calibration operation is performed at least once per driving cycle of the vehicle, such as before and/or after driving. However, for greater accuracy, it is suggested that the first calibration operation is carried out when no current is flowing, preferably when the switches or contactors are open.

Preferably, the second calibration mode is carried out cyclically during a driving cycle or at least once per driving cycle of the vehicle.

Preferably, the first and/or second calibration mode is carried out at different temperatures. This allows various temperature-dependent correction coefficients to be obtained.

It is particularly preferable to carry out the first and/or second calibration operation repeatedly at different temperatures.

Correction parameters are preferably saved. Old parameters are checked for plausibility with newly determined parameters. Due to aging and temperature, the deviation should be within a certain range.

Preferably, the at least one sub-grid is formed by a charging grid for charging the battery pack or by a traction grid for traction of the vehicle. The charging grid comprises a charging socket, for example, which is used to connect the charging grid to a charging station. The traction grid can comprise at least one electric motor to drive the vehicle.

An operating procedure for a vehicle on-board power supply system is also proposed. The vehicle on-board power supply system comprises a battery pack with a plurality of battery cells and at least one sub-grid that can be coupled to the battery pack via contactors.

The operation of the battery pack and/or the at least one sub-grid is monitored and/or controlled by recording voltage values. The voltage measurement method according to the invention is used to record the voltage values.

A control unit for a vehicle on-board power supply system is also proposed. The control unit is configured to carry out the voltage measurement method according to the invention and/or the operating method according to the invention or to be used in such a method.

An on-board power supply system for a vehicle is also proposed. The vehicle on-board power supply system comprises a battery pack with a plurality of battery cells, at least one sub-grid that can be coupled to the battery pack via contactors, and a control unit according to the invention.

The invention also relates to a vehicle comprising an on-board power supply system according to the invention.

The absolute accuracy of the voltage can be improved using the voltage measurement method according to the invention. When the contactors are open, no current flows that would cause a voltage drop at the busbar. Therefore, the sum of the cell voltages corresponds to the pack voltage. The sum of the cell voltages is measured very precisely and redundantly. Errors would stand out here. The sum of the cell voltages can therefore be equated to the pack voltage and thus a mathematical measured value correction can be carried out. This means that inaccurate resistors or components can also be used in the measurement chain, as errors can be calibrated out, which results in a significant reduction in costs.

Furthermore, the relative accuracy of the voltage is improved using the method according to the invention. As soon as the contactors are closed, the same voltage is present on both measurement paths, namely for the pack voltage and the sub-grid voltage. This means that the possibly slightly different measured values physically represent the same value and can be equated. The voltages are therefore not absolutely more accurate, but relative to each other. This allows the voltage across the contactor to be reduced to a maximum via the measured value correction in the next driving cycle when the contactors have to be closed after pre-charging. Here, too, the precise resistors can be omitted, which would result in better absolute and thus also relative accuracy. This concept works at any point where grids are to be connected via switches.

The first and second calibration modes can be easily combined with each other. The absolute accuracy of the pack voltage can be achieved by the first calibration operation. If this is offset against the relative accuracy of the pack voltage to the sub-grid voltages of the other sub-grids, such as the voltage of a charging grid and the voltage of a traction grid or the relative accuracy of the sub-grid voltages of the other sub-grids to each other, a good absolute accuracy of the sub-grid voltages of all sub-grids can be achieved. This enables good absolute and relative accuracy of the sub-grid voltages of all sub-grids to be achieved.

BRIEF DESCRIPTION OF THE DRAWINGS

Embodiments of the invention are explained in greater detail with reference to the drawing and the following description.

The FIGURES show:

FIG. 1 is a schematic representation of a vehicle on-board power supply system that is configured to carry out the voltage measurement and operation method according to the invention.

DETAILED DESCRIPTION

FIG. 1 shows a schematic representation of an on-board power supply system 100 of a vehicle which is configured to carry out the voltage measurement and operation method according to the invention.

FIG. 1 shows that the on-board power supply system 100 comprises a battery pack 10, a first sub-grid 20, and a second sub-grid 30.

The battery pack 10 comprises a plurality of battery cells 2, which are connected in series and each have a cell voltage UZ. The battery cells 2 can be connected in parallel or in series.

A cell voltage measuring device 12, such as a sensor of a cell supervisor circuit (CSC), is assigned to each of the battery cells 2. The individual cell voltages UZ can be recorded very precisely using the cell voltage measuring devices 12.

A pack voltage measuring device 14, which can be designed as a voltage divider, is also assigned to the battery pack 10. The pack voltage measuring device 14 can be integrated into the battery pack 10.

The first sub-grid 20, which in the present case is designed as a traction grid for traction of the vehicle, comprises a DC link capacitor CL, which is also referred to as an intermediate circuit capacitor, and an electrical load RL, which is, for example, an electric motor for driving the vehicle. FIG. 1 shows that the first sub-grid 20 can be coupled to the battery pack 10 via contactors, namely a first main contactor SH+ and a second main contactor SH−. To measure a first sub-grid voltage UB, a first sub-grid voltage measuring device 22, which can be designed as a voltage divider, is assigned to the first sub-grid.

The second sub-grid 30, which in the present case is designed as a charging grid for charging the battery pack 10, comprises a charging socket 34 for connection to a DC charging station, for example. FIG. 1 shows that the second sub-grid 30 can be connected to the first sub-grid 20 via contactors, namely a first charging contactor SL+ and a second charging contactor SL−, and can therefore be electrically connected to the battery pack 10. To measure a second sub-grid voltage UL, a second sub-grid voltage measuring device 32, which can be designed as a voltage divider, is assigned to the second sub-grid. It is also conceivable that the second sub-grid 30 is connected directly to the battery pack 10 by means of the first and second charging contactors SL+, SL−.

The individual cell voltages UZ measured by the cell voltage measuring devices 12, the pack voltage UP measured by the pack voltage measuring device 14, the first sub-grid voltage UB measured by the first sub-grid voltage measuring device 22 and the second sub-grid voltage UL measured by the second sub-grid voltage measuring device 32 are transmitted to a control unit 40 of the on-board power supply system 100, which is configured to carry out the voltage measuring and operating method according to the invention. The first correction factor and the second correction factor or further correction factors, such as a further correction factor representing the relative accuracy of the first sub-grid voltage UB of the first sub-grid 20 to the second sub-grid voltage UL of the second sub-grid 30, are calculated on the basis of the transmitted measured voltages. These correction factors are then used for the voltage measurement.

The invention is not limited to the exemplary embodiments described herein and the aspects emphasized thereby. Rather, within the range specified by the claims, a large number of modifications are possible which lie within the abilities of a person skilled in the art.

The invention claimed is:

1. A voltage measurement method for an on-board power supply system of a vehicle, the on-board power supply system comprising a battery pack with a plurality of battery cells and at least one sub-grid which can be coupled to the battery pack via contactors, the voltage measurement method comprising the following steps:
   in an initial calibration mode with open contactors:
      measuring using a plurality of cell voltage measuring devices, cell voltages of the individual battery cells and providing the cell voltages to a control unit;
      calculating, via the control unit, a calculated pack voltage of the battery pack using the measured cell voltages;
      measuring using a pack voltage measuring device, a measured pack voltage of the battery pack and providing the measured pack voltage to the control unit; and
      calculating, via the control unit, a first correction factor for the pack voltage using the calculated pack voltage and the measured pack voltage;
      wherein each of the cell voltage measuring devices is assigned to one battery cell of the plurality of battery cells and configured to measure the cell voltage associated with the one battery cell.

2. The voltage measurement method according to claim 1, wherein the voltage measurement method further comprises the following method steps:
   in a second calibration mode with closed contactors:
      measuring the pack voltage of the battery pack;
      measuring a sub-grid voltage of at least one sub-grid;
      calculating, via the control unit, a second correction factor for the sub-grid voltage using the measured and corrected pack voltage and the measured sub-grid voltage;
   and
      in a measurement mode:
         using the first and second correction factor when measuring the pack voltage and the sub-grid voltage in the on-board power supply system.

3. The voltage measurement method according to claim 1, wherein the first calibration operation is carried out by the control unit at least once per driving cycle of the vehicle.

4. The voltage measurement method according to claim 1, wherein the second calibration operation is carried out by the control unit cyclically during a driving cycle or at least once per driving cycle of the vehicle.

5. The voltage measurement method according to claim 1, wherein the first and/or the second calibration operation are carried out at different temperatures.

6. The voltage measurement method according to claim 5, wherein the first and/or the second calibration operation are carried out repeatedly at different temperatures.

7. The voltage measurement method according to claim 1, wherein correction parameters are stored, whereby old parameters are checked for plausibility with newly determined parameters.

8. The voltage measurement method according to claim 1, wherein the at least one sub-grid is formed by a charging grid for charging the battery pack or by a traction grid for traction of the vehicle.

9. An operating method for an on-board power supply system of a vehicle, the on-board power supply system comprising a battery pack having a plurality of battery cells and at least one sub-grid which can be coupled to the battery pack via contactors, wherein
   the operation of the battery pack and/or of the at least one sub-grid is monitored and/or controlled by detecting voltage values, and
   a voltage measurement method according to claim 1 is used to detect the voltage values.

10. An on-board power supply system for a vehicle, comprising a battery pack with a plurality of battery cells, at least one sub-grid which can be coupled to the battery pack via contactors, and a control unit configured to in an initial calibration mode with open contactors:
   receive battery cell voltages of the individual battery cells measured by cell voltage measuring devices;
   calculate a calculated pack voltage of the battery pack using the measured cell voltages;
   receive a measured pack voltage of the battery pack measured by a pack voltage measuring device; and
   calculate a first correction factor for the pack voltage using the calculated pack voltage and the measured pack voltage;
   wherein each of the cell voltage measuring devices is assigned to one battery cell of the plurality of battery cells and configured to measure the cell voltage associated with the one battery cell.

11. A vehicle comprising an on-board power supply system according to claim 10.

12. The on-board power supply system according to claim 10, wherein
   the control unit is configured to in a subsequent calibration mode with closed contactors:
      receive the measured pack voltage of the battery pack measured by the pack voltage measuring device;
      receive a sub-grid voltage of at least one sub-grid measured by a sub-grid voltage measuring device;
      calculate a second correction factor for the sub-grid voltage using the measured and corrected pack voltage and the measured sub-grid voltage;
   and
      in a measurement mode:
         using the first and second correction factor when measuring the pack voltage and the sub-grid voltage in the on-board power supply system.

* * * * *